T. W. HANRATH.
TAPE MEASURE.
APPLICATION FILED AUG. 24, 1908.
940,873.
Patented Nov. 23, 1909.
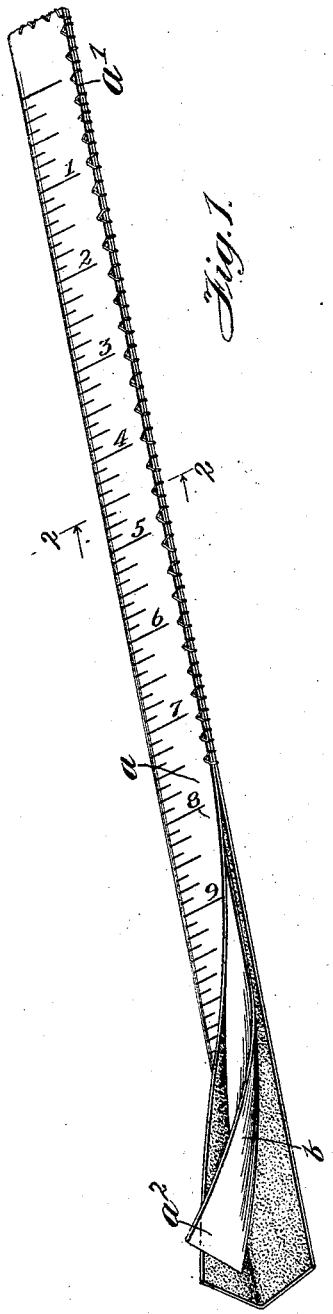
Witnesses:
Inventor:
Theodore W. Hanrath
By Cheever & Cox
Attys

UNITED STATES PATENT OFFICE.

THEODORE W. HANRATH, OF CHICAGO, ILLINOIS.

TAPE-MEASURE.

940,873.　　　　　　Specification of Letters Patent.　　Patented Nov. 23, 1909.

Application filed August 24, 1908. Serial No. 449,957.

*To all whom it may concern:*

Be it known that I, THEODORE W. HANRATH, a citizen of the United States, residing at Chicago, in the county of Cook and State of Illinois, have invented a certain new and useful Improvement in Tape-Measures, of which the following is a specification.

My invention relates to tape measures.

Preparatory to a detailed description of the invention it may be stated that heretofore it has been found practically impossible to produce a tape measure which would neither stretch as a result of use nor shrink as a result of the action of the moisture of the atmosphere.

Steel tape used for surveying and similar purposes is practically non stretchable and non shrinkable but such a tape can not be employed by tailors for taking measurements of the person and for drafting patterns. A tape for tailors' use must have great flexibility and a strip of fabric has heretofore been found to be the only practical material from which tapes could be made. But no fabric has been found which would neither stretch nor shrink and most of the tapes heretofore made have in addition to one or the other of these drawbacks shown a tendency to crease or wrinkle with the result of permanently shortening the tape.

With the above considerations in mind the object of the invention is to produce a tape measure which shall be non shrinkable and non stretchable, also to produce a tape measure which will not permanently acquire the small creases or wrinkles which tend to permanently shorten a tape measure after it has been in use for a considerable period.

Another object of the invention is to provide a tape of this character whereon the markings are plain and substantially indelible.

I obtain my objects in the manner illustrated in the accompanying drawings, in which:

Figure 1 is a perspective view of a portion of the tape measure embodying my invention. One end is laid open to reveal the construction. Fig. 2 is an enlarged cross section of the tape measure.

Similar letters refer to similar parts in both views.

My improved tape measure consists in general of a sheath $a$ and an insert $b$, the sheath being formed by folding over a strip of fabric upon itself and securing the edges by stitching $a'$ or other suitable means. This sheath consists of a compound fabric, the outer surface being composed preferably of sateen or similar woven fabric and the inner surface being composed of rubber in a more or less pure state. In other words, the sheath may be said to consist of a rubberized woven fabric formed by impregnating or indurating one surface of the woven fabric with rubber. This compound fabric while susceptible to stretching action to a certain extent is non shrinkable, the presence of the rubber preventing shortening of the strip when subjected to the action of moisture. The sheath strip is so folded as to bring the rubberized surface upon the inside, and upon the outside is printed the ordinary tape markings. As the exposed sateen or similar fabric is free from rubber on its exterior surface it will take ordinary printer's ink from ordinary metal type and the printing thus made is practically indelible. No special process is required to make the ink stick and no extraordinary kind of ink is requisite.

Extending longitudinally within the sheath is the insert or stay $b$ above mentioned and this consists of a non-stretchable fabric, preferably linen, coated with starch or other sizing. By preference the insert is but slightly narrower than the sheath, is laid flat therein and secured in position by the aforesaid stitching $a'$. It is desirable that the stitching should also secure the ends of the insert to the ends of the sheath as indicated.

In the completed article it will be observed that the insert lies within a practically water proof cover, for the rubberized fabric of the sheath will not permit the penetration of moisture through it and the stitched edge is also practically moisture proof. Linen itself will shrink to a greater or less extent when subjected to moisture but in a tape of my construction not only is the linen protected from moisture by the practically moisture proof sheathing but it is further protected by the sizing with which it is covered. The tape is therefore practically non-stretchable and non-shrinkable.

Another advantage in this tape is that it can not acquire set wrinkles. The presence of the rubber on the inner surface of the sheath prevents the sheath from receiving creases, and even if such creases are temporarily made as a result of crumpling by the user, the rubber is yieldable and springs the sateen back into shape again with the result that the exterior is always smooth and there is no take up or shrinkage due to wrinkling.

Having thus described my invention, what I claim as new, and desire to secure by Letters Patent, is:

A tape measure comprising a sheath consisting of a strip of fabric rubberized on one side only and folded double with the unrubberized surface outside, an insert consisting of a strip of sized linen within the sheath and marginal stitching running the length of the measure and penetrating the edges of both the sheath and the insert.

In witness whereof, I have hereunto subscribed my name in the presence of two witnesses.

THEODORE W. HANRATH.

Witnesses:
 HOWARD M. COX,
 C. J. CHRISTOFFEL.